United States Patent
Blanpain et al.

(10) Patent No.: US 12,466,550 B2
(45) Date of Patent: Nov. 11, 2025

(54) DEVICE FOR ROTATING AN AIRCRAFT WHEEL

(71) Applicants: SAFRAN LANDING SYSTEMS, Velizy-Villacoublay (FR); SAFRAN ELECTRICAL COMPONENTS, Loches (FR)

(72) Inventors: Thierry Blanpain, Moissy-Cramayel (FR); Didier Brun, Moissy-Cramayel (FR); Olivier Piqueux, Moissy-Cramayel (FR); Stéphane Basset, Moissy-Cramayel (FR)

(73) Assignees: SAFRAN LANDING SYSTEMS, Velizy-Villacoublay (FR); SAFRAN ELECTRICAL COMPONENTS, Loches (FR)

( * ) Notice: Subject to any disclaimer, the term of this patent is extended or adjusted under 35 U.S.C. 154(b) by 0 days.

(21) Appl. No.: 18/853,041

(22) PCT Filed: Mar. 31, 2023

(86) PCT No.: PCT/EP2023/058583
§ 371 (c)(1),
(2) Date: Sep. 30, 2024

(87) PCT Pub. No.: WO2023/187207
PCT Pub. Date: Oct. 5, 2023

(65) Prior Publication Data
US 2025/0250003 A1    Aug. 7, 2025

(30) Foreign Application Priority Data
Apr. 1, 2022   (FR) ...................................... 2203002

(51) Int. Cl.
*B64C 25/32* (2006.01)

(52) U.S. Cl.
CPC .................................. *B64C 25/405* (2013.01)

(58) Field of Classification Search
CPC .............................. B64C 25/40; B64C 25/405
See application file for complete search history.

(56) References Cited

U.S. PATENT DOCUMENTS

| 2,335,398 A | * | 11/1943 | Downey | ................. B64C 25/40 244/103 S |
| 2,500,577 A | * | 3/1950 | Sands, Jr. | ............... B64C 25/40 310/67 R |
| 9,708,056 B2 | * | 7/2017 | Ehrhart | ................. B64C 25/405 |

FOREIGN PATENT DOCUMENTS

| FR | 2954236 A1 | 6/2011 |
| GB | 1213862 A | 11/1970 |
| WO | 2014090334 A1 | 6/2014 |

OTHER PUBLICATIONS

International Search Report mailed Jun. 22, 2023, issued in corresponding International Application No. PCT/EP2023/058583, filed Mar. 31, 2023, 5 pages.

(Continued)

*Primary Examiner* — Nicholas McFall
(74) *Attorney, Agent, or Firm* — Christensen O'Connor Johnson Kindness PLLC

(57) ABSTRACT

A landing gear for an aircraft having an axle carried by a strut, the axle including a rotatably-mounted wheel and a drive device for rotating the wheel about a rotation axis. The drive device can have a motor mounted at one end of the axle for transmitting a rotational torque to the wheel, a body projecting out of the motor and snugly received in the axle, and at least a first harness extending along the body and connecting the motor to at least a first coupler carried by a free end of the body to cooperate with a second coupler of the landing gear to supply the motor with power. The second coupler received in an opening formed in the axle at the (Continued)

junction between the strut and the axle, the opening extending along an axis perpendicular to the axis of rotation of the wheel.

10 Claims, 7 Drawing Sheets

(56) References Cited

OTHER PUBLICATIONS

Written Opinion mailed Jun. 22, 2023, issued in corresponding International Application No. PCT/EP2023/058583, filed Mar. 31, 2023, 8 pages.

* cited by examiner

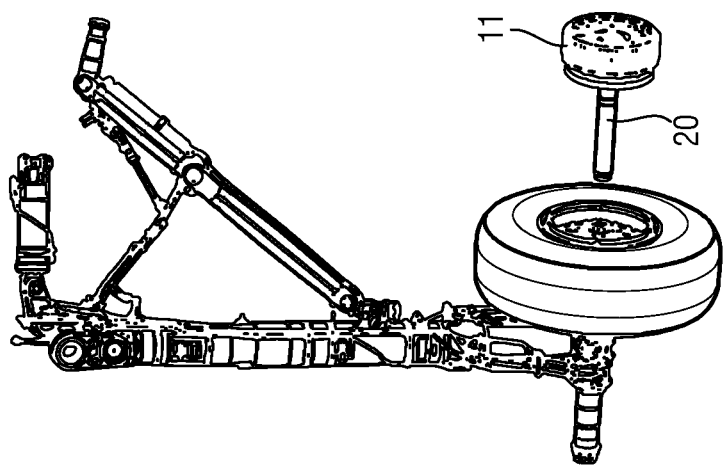
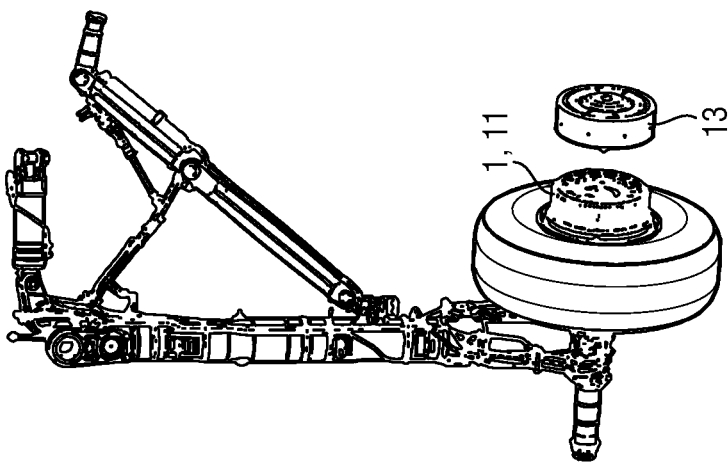
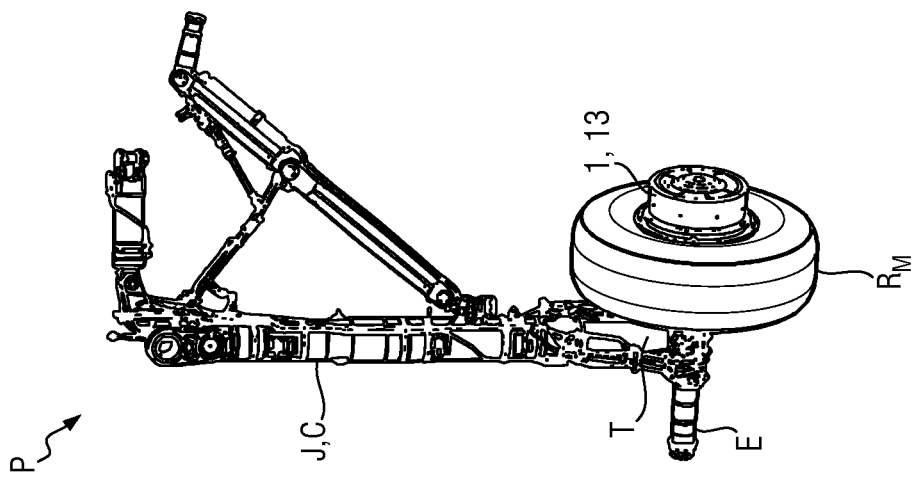
Fig. 6

DEVICE FOR ROTATING AN AIRCRAFT WHEEL

CROSS-REFERENCE TO RELATED APPLICATIONS

This application is a National Stage of International Application No. PCT/EP2023/058583, filed Mar. 31, 2023, which claims priority to French Patent Application No. 2203002, filed Apr. 1, 2022, the entire disclosures of which are hereby incorporated by reference in their entirety for all purposes.

The present invention relates to the movement of an aircraft on the ground and, more particularly, an aircraft landing gear comprising a wheel and a drive device for rotating the wheel. The invention also relates to an aircraft equipped with such a landing gear.

BACKGROUND OF THE INVENTION

In the aviation field, aircraft are now fitted with drive members for rotating the wheels in order to allow the aircraft to move on the ground without using its power units. A drive member mounted on a landing gear is described in document FR-A-3024706. This drive member comprises an electric motor mounted at one end of an axle carrying the wheels of the landing gear in order to transmit rotational torque to one of said wheels via a connection interface.

The wires supplying power to the electric motor, and the wires used to control the sensors and the actuators that equip the motorized wheel, are generally routed down the landing gear and are provided at one end with a connector intended to be connected to the motor.

In order to connect these power supply wires to the motor, proposals have been made to route them to the motor without coming into contact with the wheel. However, the wires and their connectors are subject to impacts (birds, stones, tyre debris, hail, lightening, etc.).

Proposals have also been made to route the power supply wires to the motor through the axle, passing them through the centre of the axle to one end of said axle. However, the small gauge of the power supply wires means that said power supply wires are very rigid and have a large permissible bending radius, which means that they cannot be integrated into the axle with an excess length that allows the motor to be removed. Moreover, as the wires emerge through the end of the axle, a portion of them is always subject to flying debris, and a slack loop is needed to connect/disconnect the motor.

OBJECT OF THE INVENTION

The aim of the invention is therefore to propose a device that at least partially overcomes the abovementioned disadvantages.

SUMMARY OF THE INVENTION

To this end, the invention proposes an aircraft landing gear comprising an axle carried by a strut and provided with a rotatably-mounted wheel. The landing gear is equipped with a drive device for rotating the wheel. The drive device comprises a motor mounted at one end of the axle for transmitting a rotational torque to the wheel, and a body projecting out of the motor and snugly received in the axle, at least a first harness extending along the body and connecting the motor to at least a first coupler carried by a free end of the body to cooperate with a second coupler of the landing gear so as to supply the motor with power.

According to the invention, the second coupler is received in an opening formed in the axle at the junction between the strut and said axle.

In a particular manner, the drive device comprises a second harness connected to the first coupler and extends along the body to relay signals from sensors equipping the device and/or the wheel.

In a particular manner, the motor is electric.

According to one particular feature, the second coupler is received in the opening of the axle to couple with the first coupler when the drive device is fitted to the axle.

In a particular manner, the couplers are arranged to couple by mutual engagement in a direction parallel to a longitudinal axis of the tubular body.

According to another particular feature, the second coupler is received in the opening of the axle after the drive device has been fitted to the axle in order to couple with the first coupler.

In a particular manner, the first coupler and the second coupler are arranged to couple by mutual engagement in a direction orthogonal to a longitudinal axis of the body.

In a particular manner, the second coupler is designed to receive the first coupler.

In a particular manner, the first coupler is designed to receive the second coupler.

The invention further relates to an aircraft comprising at least one such landing gear.

BRIEF DESCRIPTION OF THE DRAWINGS

The invention will be better understood in the light of the following description, which is purely illustrative and non-limiting, and should be read with reference to the accompanying drawings, in which:

FIG. 6 shows the removal of the drive device shown in FIGS. 3 to 5.

DETAILED DESCRIPTION OF THE INVENTION

Figure 1:
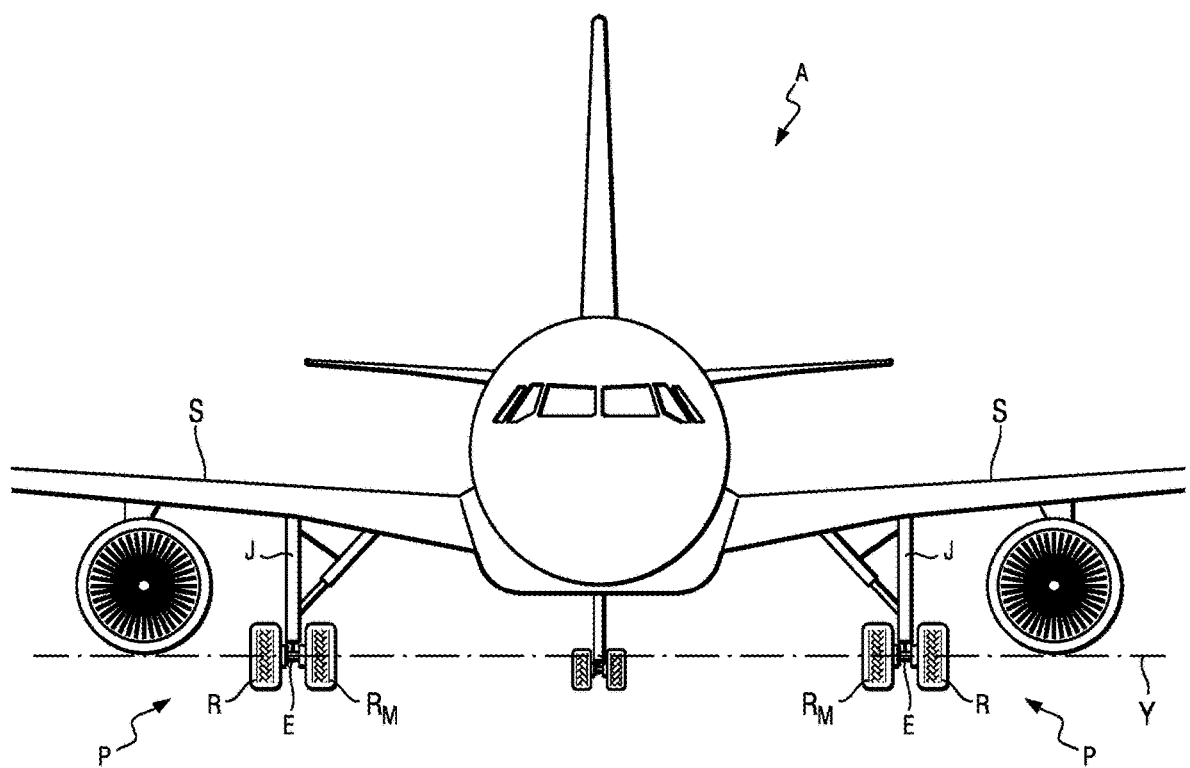
FIG. 1 is a simplified representation of an aircraft comprising main landing gears comprising wheels provided with a drive device for rotating them according to the invention.

An aircraft A comprises, as shown in FIG. 1, two main landing gears P each comprising a leg J having a first end hinged to a structure S of the aircraft A and an opposing second end carrying wheels R, $R_M$ rotating on an axle E about an axis Y. The leg J is able to move between a stowed position (not shown) and a deployed position which is shown here.

Each of the wheels R, $R_M$ comprises a rim receiving a tyre and is equipped with a brake. The rim is connected by a web to a hub mounted so as to rotate on the axle E about the axis Y. In a manner that is known per se, the brake comprises a stack of discs received in an annular space delimited by the rim and the hub. The stack of discs comprises alternating stator discs that are unable to rotate in relation to the axle E and rotor discs that are unable to rotate in relation to the rim. A hydraulic jack is arranged to apply a pressing force to the stack of discs via a hydraulic ring. Each time the pilot of the aircraft A applies the brakes, this causes the temperature of the brake discs and their immediate surroundings to increase, making it necessary to provide heat shields, which are not described in detail here.

Figure 2:
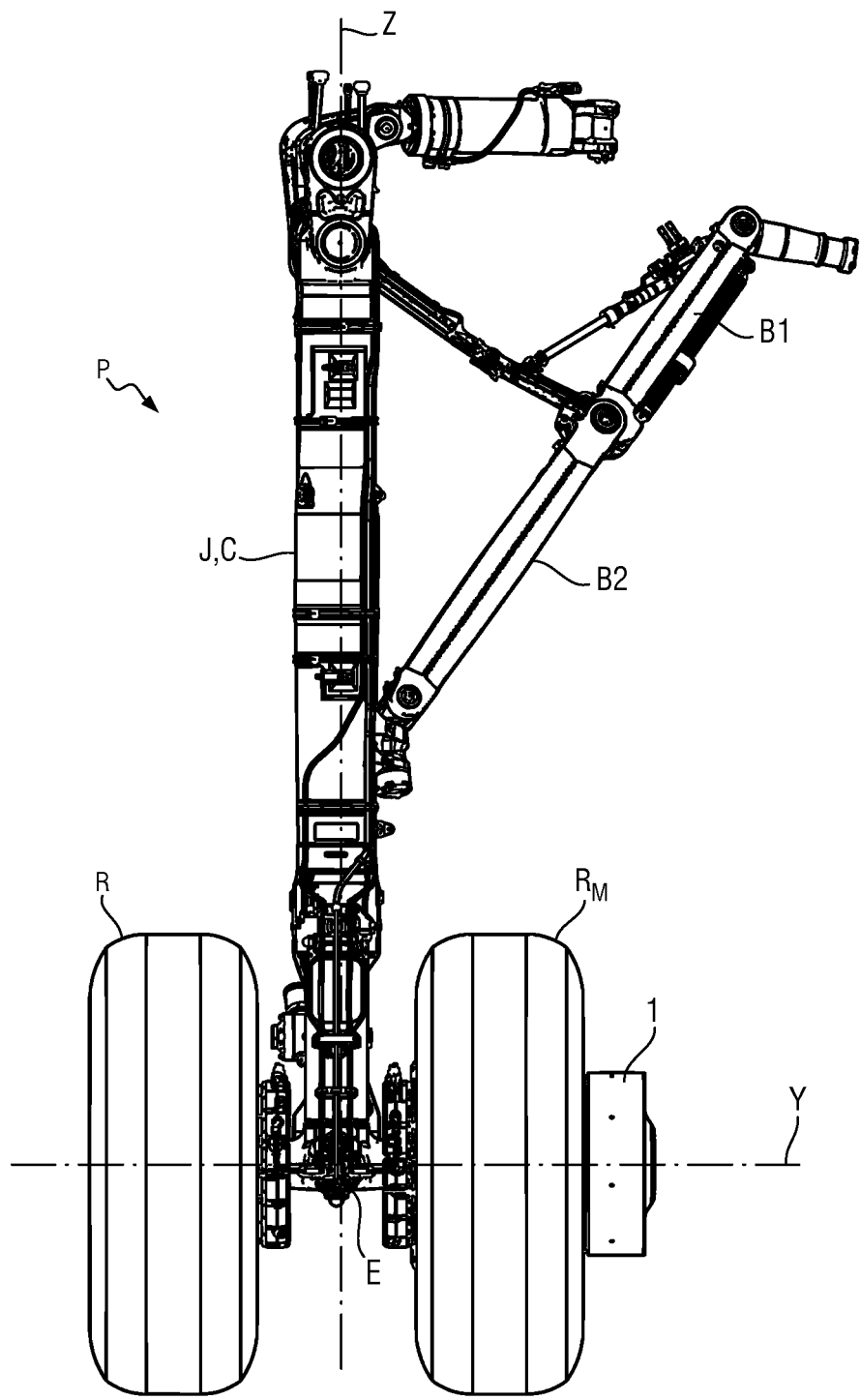
FIG. 2 is a front view of one of the main landing gears of the aircraft shown in FIG. 1.

In reference to FIG. 2, the leg J is kept in the deployed position by means of a bracing member comprising a first connecting rod B1 hinged to the structure S of the aircraft A and a second connecting rod B2 hinged to the leg J and to the first connecting rod B1. When in the deployed position, the first connecting rod B1 and the second connecting rod B2 are in a substantially aligned position.

The leg J comprises a box C hinged to the structure S of the aircraft A, and a strut T mounted so as to be able to slide in the box C along an axis Z to form a damper. At a lower end, the strut T carries the axle E upon which the wheels R, RM are pivotally received. In a manner that is known per se, main scissors and secondary scissors (not shown here) allow the strut T to slide in the box C, while preventing the strut T from pivoting about the axis Z in relation to the box C. The axle E is secured to the strut T in such a way that said axle E is stationary with respect to said strut T. The axis z is in this instance substantially perpendicular to the axis Y.

The wheels Ry are referred to as "motorized" wheels, i.e., they are equipped with a drive device 1 intended to move the aircraft A without using its power units when it is on the ground. The description below relates to a single motorized wheel $R_M$, but the invention naturally applies in the same way to all or some of the motorized wheels $R_M$ of the aircraft A.

Figure 3:
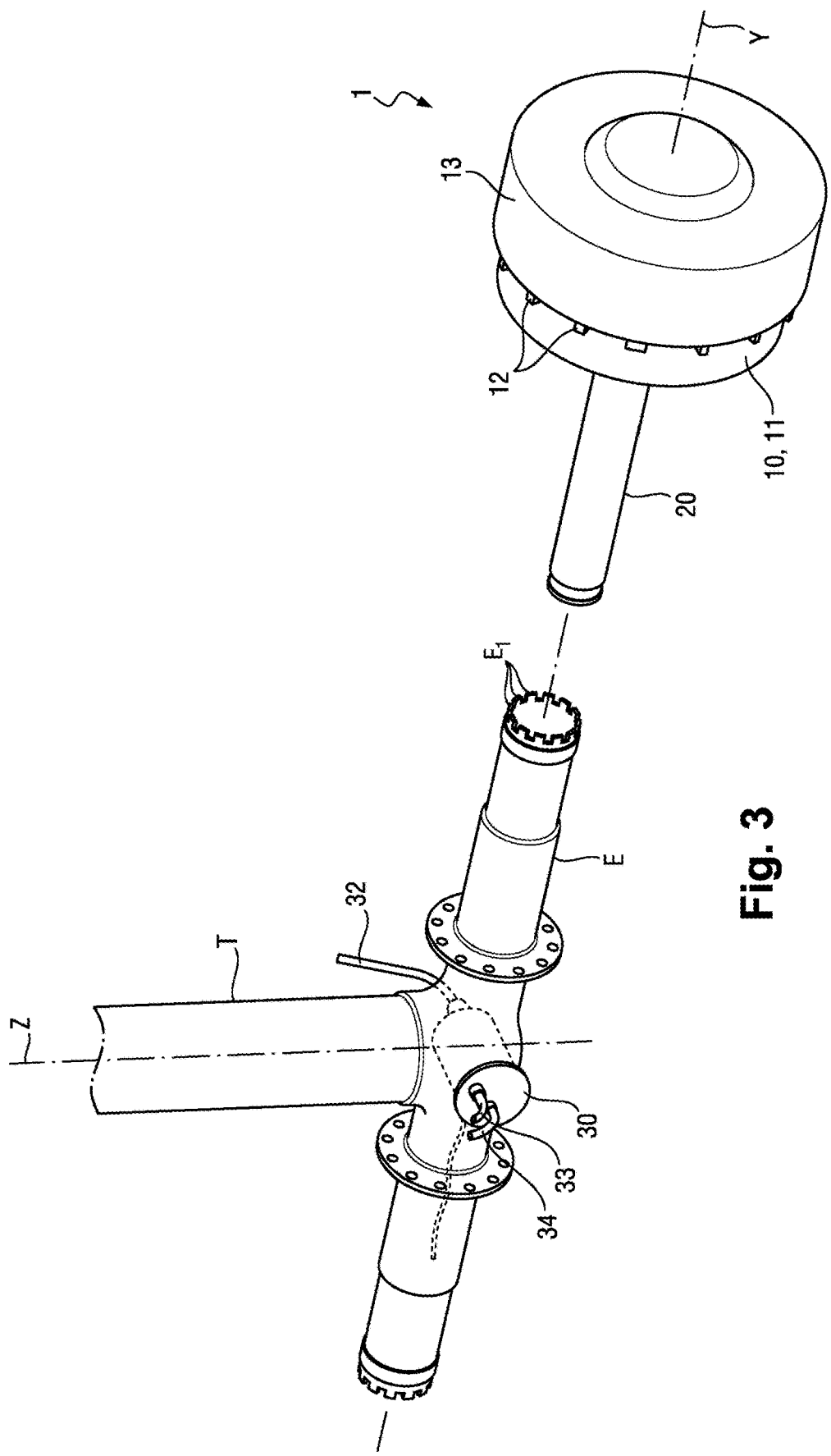
FIG. 3 is a perspective view of the axle and the drive device equipping the main landing gear shown in FIG. 2.
Figure 4:
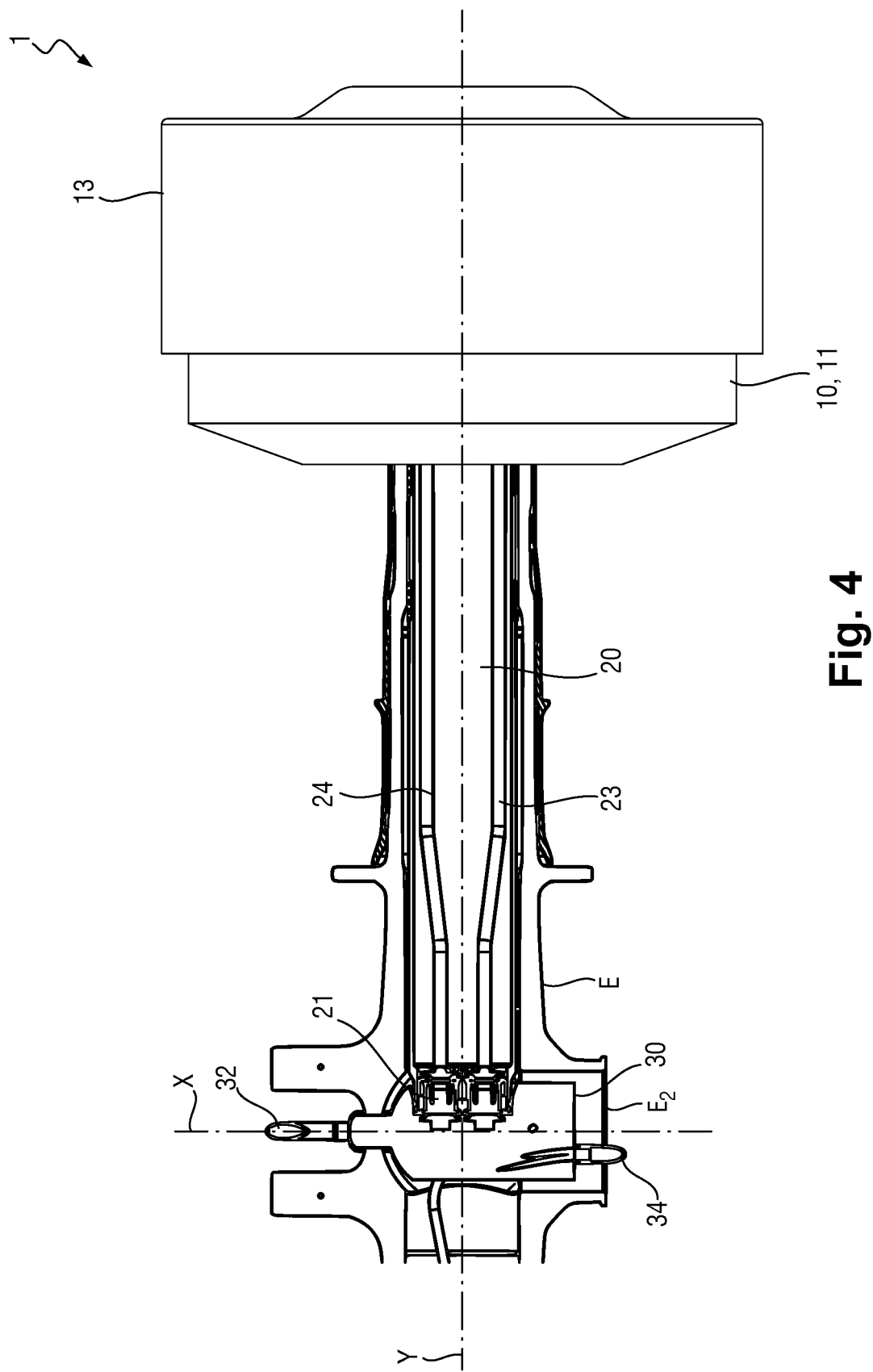
FIG. 4 is an axial cross-sectional view of the axle and the drive device shown in FIG. 2.

In reference to FIGS. 3 and 4, the drive device 1 comprises a first generally cylindrical body 10 and a second tubular body 20 projecting coaxially from the first body 10. The first body 10 and the second body 20 respectively constitute a motorization region for driving the wheel Ry and an engagement region for engaging the drive device 1 in the axle E.

The cylindrical body 10 comprises an electric motor 11 mounted at a free end of the axle E which is bordered by axial protrusions forming dogging teeth $E_1$ (FIG. 3).

The motor 11 comprises a stator carrying magnetic coils at its periphery. The stator is coupled to the axle E by the engagement of the dogging teeth $E_1$ of said axle E in housings provided in said stator, such that the stator is stationary with respect to the axle E.

The motor 11 also comprises a rotor mounted so as to be able to rotate on the stator, in this instance by means of bearings. The rotor comprises a drum carrying permanent magnets. When a current flows through the coils to create a rotating magnetic field, this induces mechanical torque on the drum, causing it to rotate. When the drive device 1 is in position on the axle E, the axis of rotation of the rotor coincides with the axis Y of rotation of the wheel $R_M$. The drum carries a plurality of ties 12 that extend parallel to the axis of rotation of the rotor. An interface member (not shown) extends between the ties 12 and the rim of the wheel $R_M$, constraining the drum of the rotor to rotate with the rim in such a way as to transmit torque from said rotor to said wheel $R_M$.

The cylindrical body 10 also comprises an electric fan 13 mounted on the motor 11 in order to create an air flow around the brake discs and around the motor 11 so as to accelerate the cooling of said brake discs and said motor 11 and their immediate surroundings.

The tubular body 20 is secured to the stator and is snugly received in the axle E, the tubular body 20 in this instance extending coaxially in relation to said axle E. A free end of the tubular body 20 carries a male electric coupler 21 leading to a central opening $E_2$ formed in the axle E at the junction between the strut T and said axle E. The opening $E_2$ extends along an axis X perpendicular to the axis Y and to the axis Z and receives a female electric coupler 30 designed to receive, in a direction parallel to the axis Y, the male electric coupler 21 carried by the tubular body 20 of the drive device 1.

A mechanism is provided for locking the drive device 1 in a connected position in which the male coupler 21 is received in the female coupler 30.

A guide system provided on the female coupler 30 and on the tubular body 20 ensures that the male coupler 21 and the female coupler 30 are correctly aligned before they are connected.

An angular keying system provided in this instance on the female coupler 30 and on the tubular body 20 ensures that the male coupler 21 and the female coupler 30 have the correct angular orientation before they are connected. The keying system may also be provided on the axle E.

Figure 5:
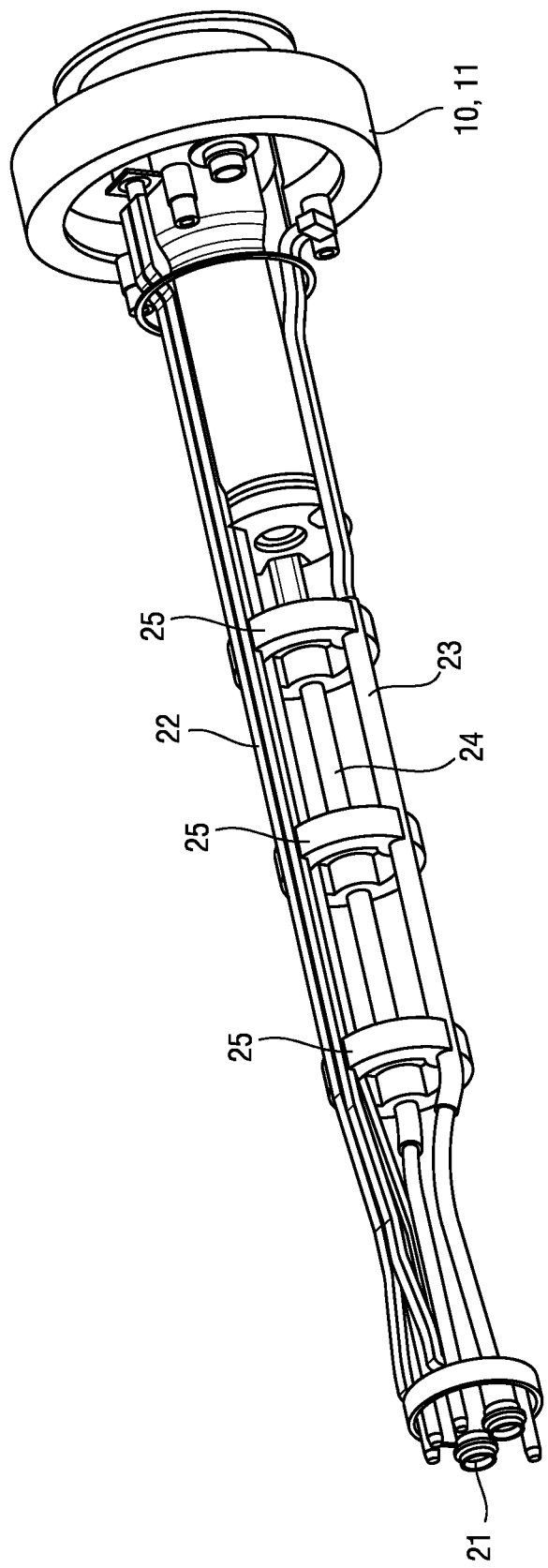
FIG. 5 is a perspective view of part of the drive device shown in FIG. 2.

In reference to FIGS. 4 and 5, first electric harnesses 22, 23, 24 extend in a substantially straight manner inside the tubular body 20 from the male electric coupler 21 to the cylindrical body 10. FIG. 5 shows:
  an electric power harness 22 for supplying current to the motor of the drive device 1 and the fan 13 for cooling the brake; and
  two electric signal harnesses 23, 24 for relaying signals from various sensors equipping the drive device 1 and/or signals for managing the landing gear equipping the wheel $R_M$, such as the rotational speed of the wheel $R_M$, the tyre pressure, the temperature of the brake discs, etc.

For safety reasons, the harnesses 22, 23, 24 are kept in position in the tubular body 20 of the drive device 1, in this instance via positioning rings 25, in such a way that they are spaced apart by a predetermined minimum distance to ensure they are separated and to make it easier to armour them. In this instance, the harness 24 constitutes a redundant version of the harness 23 in order to ensure the relaying of the signals from the sensors and/or the signals for managing the landing gear P. More generally, other harnesses may extend into the tubular body 20 if necessary.

Second electric harnesses 32, 33, 34 extend from the female coupler 30, rising along the strut T to the structure S of the aircraft A. FIGS. 3, 4 and 5 show:
  an electric power harness 32 connected, via the male coupler 21, to the harness 22 for supplying current to the motor 11 of the drive device 1 and the fan 13 for cooling the brake; and
  two electric signal harnesses 33, 34 respectively connected, via the male coupler 21, to the harnesses 23, 24, for relaying signals from the various sensors and/or signals for managing the landing gear P.

The power harness 32 and the signal harnesses 33, 34 are in this instance respectively routed along the main scissors and the secondary scissors. If necessary, other harnesses may be routed there.

The sequence for removing the drive device 1 is shown in FIG. 6. After checking that there is no electric current in the drive device 1, a tool is positioned on said drive device 1 in order to take up its weight when it is extracted from the axle E. The cooling fan 13 is then removed from the motor in order to access the mechanism locking the drive device 1 on the axle E. The locking mechanism is then unlocked and the drive device 1 is then extracted from the axle E by applying a pulling force to said drive device 1 along the axis Y.

The drive device 1 is fitted on the axle E by performing the steps used to remove it in reverse order. It should be understood that, once the female coupler 30 has been received in the opening $E_2$, it receives the male coupler 21 when the drive device 1 is fitted on the axle E: the female coupler 30 and the male coupler 21 couple in a direction parallel to the longitudinal axis of the tubular body 20.

Arranging the drive device 1 in this way has the following advantages, in particular:
  routing the harnesses 22, 23, 24 inside the tubular body 20 helps provide mechanical protection for said harnesses 22, 23, 24;
  the tubular body 20 forms an electrical barrier protecting the axle E from potential electric arcs which could damage said axle E;
  routing the harnesses 22, 23, 24 inside the tubular body 20 facilitates the integration of said harnesses 22, 23, 24 through the axle E (harnesses 22, 23, 24 manufactured to measure in the factory, with no extra length for removal); and
  the drive device 1 is electrically connected/disconnected automatically when it is inserted into/extracted from the axle E, facilitating the fitting and removal of the drive device 1.

Figure 7:
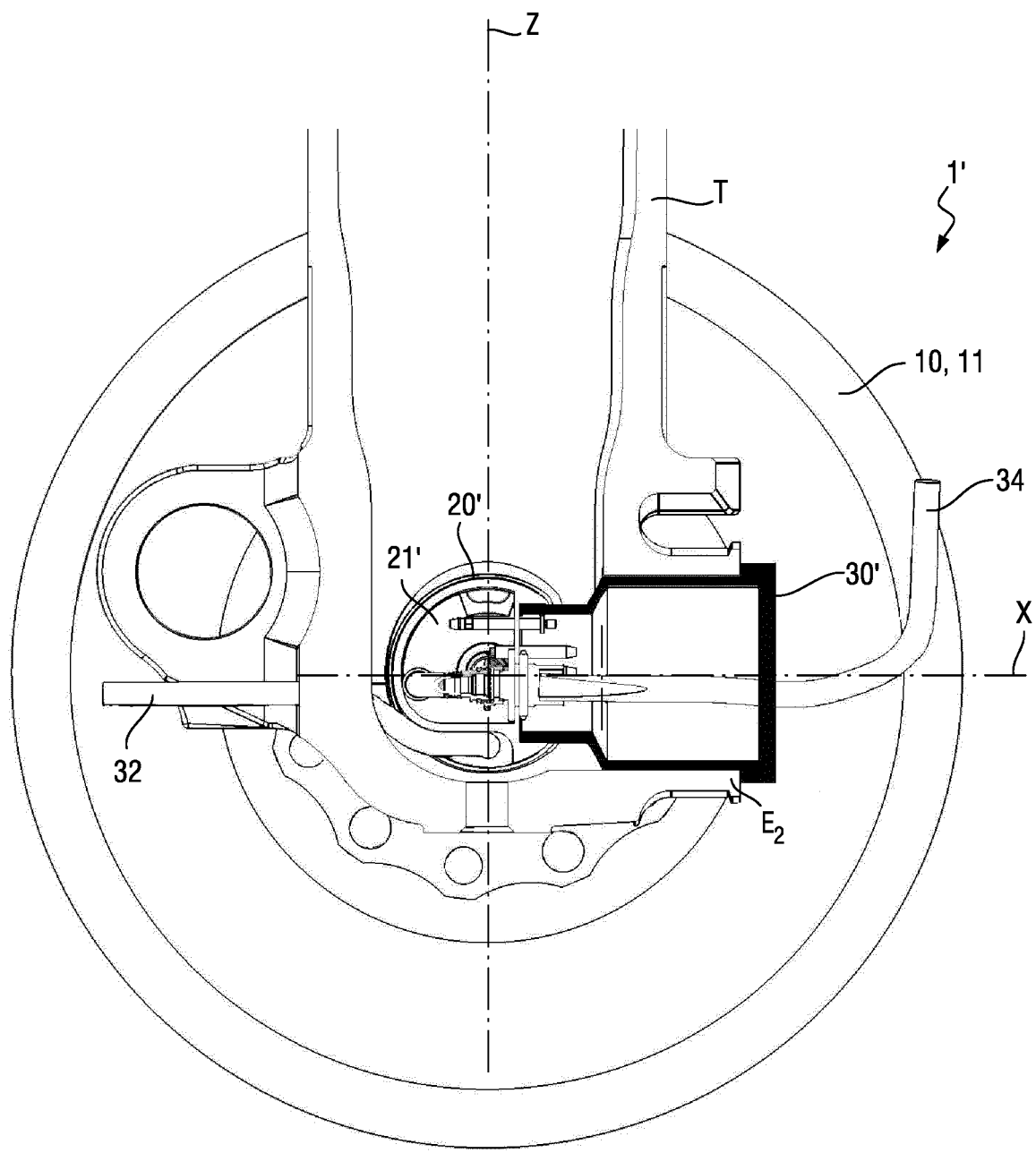
FIG. 7 is a transverse cross-sectional view of a variant of the axle and the drive device shown in FIG. 2.

FIG. 7 shows a drive device 1' that is a variant of the drive device 1. The drive device 1' differs from the drive device 1 in that it comprises a tubular body 20' that has a free end carrying a female electric coupler 21' that extends facing the central opening $E_2$ formed in the axle E (it should be understood that the length of the tubular body 20' is then greater than that of the tubular body 20). The opening $E_2$ receives a male electric coupler 30' designed to couple, in a direction parallel to the axis X, with the female electric coupler 21' carried by the tubular body 20' of the drive device 1'.

A guide system provided on the male coupler 30' and on the tubular body 20' ensures that the female coupler 21' and the male coupler 30' are correctly aligned before they are connected.

An angular keying system provided in this instance on the male coupler 30' and on the tubular body 20' ensures that the female coupler 21' and the male coupler 30' have the correct angular orientation before they are connected. The keying system may also be provided on the axle E.

The sequence for removing the drive device 1' is set out in detail below.

After checking that there is no electric current in the drive device 1', a tool is positioned on said drive device 1 in order to take up its weight when it is extracted from the axle E. The cooling fan 13 is then removed from the motor in order to access the mechanism locking the drive device 1' on the axle E. The male coupler 30' is then extracted from the opening $E_2$ by applying a pulling force to said male coupler 30' along the axis X, then the locking mechanism is unlocked in order to extract the drive device 1' from the axle E by applying a pulling force to said drive device 1' along the axis Y.

The drive device 1' is fitted on the axle E by performing the steps used to remove it in reverse order. It should be understood that the female coupler 21' receives the male coupler 30' after the drive device 1' has been fitted on the axle E: the female coupler 21' and the male coupler 30' couple in a direction orthogonal to the longitudinal axis of the tubular body 20'.

Naturally, the invention is not limited to the embodiment described, but covers any variant coming within the ambit of the invention as defined by the claims.

The number de couplers (male or female) carried by the free end of the tubular body 20, 20' of the drive device 1, 1' may be greater than one.

Although the motor 11 is in this instance electric, it may be hydraulic. The harnesses 22, 32 are then formed by rigid pipes for pressurized hydraulic fluid to be delivered to the motor 11, and the end of the tubular body 20 carries at least one hydraulic coupler.

Although in this instance the end of the tubular body 20 of the drive device 1 carries a male coupler 21, it may instead carry a female coupler designed to receive a male coupler inserted into the axle E via the opening $E_2$.

Although in this instance the end of the tubular body 20' of the drive device 1' carries a female coupler 21', it may instead carry a male coupler designed to couple with a female coupler inserted into the axle E via the opening $E_2$.

The dogging teeth $E_1$ bordering the free end of the axle E may be replaced by any mechanical means for coupling said axle E to the stator 12 of the electric motor 11 (splines, key, etc.).

If the tubular body 20, 20' is perforated (for example in order to reduce its stiffness and/or its weight), the electrical protection of the harnesses 22, 23, 24 may be provided by armour and/or insulation arranged on said harnesses 22, 23, 24.

The fan 13 may be removed before the tool taking up the weight of the drive device 1, 1' is positioned on said drive device 1, 1'.

The invention claimed is:

1. A landing gear for an aircraft, comprising:
   an axle carried by a strut, the axle having a rotatably-mounted wheel and a drive device for rotating the wheel about a rotation axis, the drive device comprising:
     a motor mounted at one end of the axle for transmitting a rotational torque to the wheel;
     a body projecting out of the motor and received in the axle; and
     at least a first harness extending along the body and connecting the motor to at least a first coupler carried by a free end of the body to cooperate with a second coupler of the landing gear to supply the motor with power,
   wherein the second coupler is received in an opening formed in the axle at a junction between the strut and the axle, the opening extending along an axis perpendicular to the rotation axis of the wheel.

2. The landing gear according to claim 1, further comprising at least one second harness connected to the first coupler and extending along the body to relay signals from sensors equipping the drive device and/or the wheel.

3. The landing gear according to claim 1, wherein the motor is electric.

4. The aircraft landing gear according to claim 1, wherein the second coupler is received in the opening of the axle to couple with the first coupler when the drive device is fitted to the axle.

5. The aircraft landing gear according to claim 4, wherein the first coupler and the second coupler are arranged to couple by mutual engagement in a direction parallel to a longitudinal axis of the body.

6. The aircraft landing gear according to claim 1, wherein the second coupler is received in the opening of the axle after the drive device has been fitted to the axle to couple with the first coupler.

7. The aircraft landing gear according to claim 6, wherein the first coupler and the second coupler are arranged to couple by mutual engagement in a direction orthogonal to a longitudinal axis of the body.

8. The aircraft landing gear according to claim 1, wherein the second coupler is designed to receive the first coupler.

9. The aircraft landing gear according claim 1, wherein the first coupler is designed to receive the second coupler.

10. An aircraft comprising at least one landing gear according to claim 1.

* * * * *